United States Patent [19]

Raterman et al.

[11] Patent Number: 5,643,537

[45] Date of Patent: *Jul. 1, 1997

[54] FCC PROCESS AND APPARATUS WITH CONTAINED VORTEX THIRD STAGE SEPARATOR

[75] Inventors: Michael F. Raterman, Doylestown, Pa.; Christopher G. Smalley, Chesterfield, N.J.

[73] Assignee: Mobil Oil Corporation, Fairfax, Va.

[ * ] Notice: The term of this patent shall not extend beyond the expiration date of Pat. No. 5,538,696.

[21] Appl. No.: 533,135

[22] Filed: Sep. 26, 1995

Related U.S. Application Data

[63] Continuation-in-part of Ser. No. 236,975, May 2, 1994, Pat. No. 5,538,696.

[51] Int. Cl.$^6$ .................................................. F27B 15/09
[52] U.S. Cl. .................... 422/147; 55/343; 55/459.1
[58] Field of Search ....................... 422/127, 147; 55/343, 345, 346, 347, 348, 349, 459.1

[56] References Cited

U.S. PATENT DOCUMENTS

| | | | |
|---|---|---|---|
| 5,122,171 | 6/1992 | Kalen et al. | 55/349 |
| 5,178,648 | 1/1993 | Kalen et al. | 55/1 |
| 5,221,301 | 6/1993 | Guirichich | 55/345 |

*Primary Examiner*—Timothy McMahon
*Attorney, Agent, or Firm*—Robert B. Furr, Jr.

[57] ABSTRACT

Vertical, small diameter cyclones are disclosed. Gas and fines are added tangentially or axially around a clean vapor outlet tube in a cylindrical cyclone. A vortex of solids and some gas passes into a contiguous and axially aligned cylindrical vortex containment means from which solids are withdrawn via a vertical slot in a sidewall of the containment means. 0–5 micron particle removal is enhanced. An FCC process uses the cyclones as a third stage separator.

10 Claims, 3 Drawing Sheets

FCC PROCESS AND APPARATUS WITH CONTAINED VORTEX THIRD STAGE SEPARATOR

CROSS-REFERENCE TO RELATED APPLICATIONS

This application is a continuation-in-part of our prior application Ser. No. 08/236,975 filed May 2, 1994, now U.S. Pat. No. 5,538,696 which is incorporated by reference.

BACKGROUND OF THE INVENTION

1. Field of the Invention

The field of the invention is fluidized catalytic cracking of heavy hydrocarbon feeds and cyclones for separating fine solids from vapor streams.

2. Description of Related Art

Catalytic cracking is widely used to convert heavy feed into lighter products by catalytically cracking large molecules into smaller molecules. In fluidized catalytic cracking (FCC) catalyst, having a particle size and color resembling table salt and pepper, circulates between a cracking reactor and a catalyst regenerator. In the reactor, hydrocarbon feed contacts a source of hot, regenerated catalyst. The hot catalyst vaporizes and cracks the feed at 425° C.–600° C., usually 460° C.–560° C. The cracking reaction deposits carbonaceous hydrocarbons or coke on the catalyst, thereby deactivating the catalyst. The cracked products are separated from the coked catalyst. The coked catalyst is stripped of volatiles, usually with steam, in a catalyst stripper and the stripped catalyst is then regenerated. The catalyst regenerator burns coke from the catalyst with oxygen containing gas, usually air. Decoking restores catalyst activity and simultaneously heats the catalyst to, e.g., 500° C.–900° C., usually 600° C.–750° C. This heated catalyst is recycled to the cracking reactor to crack more fresh feed. Flue gas formed by burning coke in the regenerator may be treated for removal of particulates and for conversion of carbon monoxide, after which the flue gas is normally discharged into the atmosphere.

Catalyst and fines must also be removed from flue gas discharged from the regenerator. Any catalyst not recovered by the regenerator cyclones stays with the flue gas, unless an electrostatic precipitator, bag house, or some sort of removal stage is added at considerable cost. The amount of fines in most FCC flue gas streams exiting the regenerator is enough to cause severe erosion of turbine blades if a power recovery system is installed to try to recover some of the energy in the regenerator flue gas stream.

The solids remaining at this point are difficult to recover, having successfully passed through several stages of highly efficient cyclones. The solids are small, essentially all are below 20 microns, and include significant amounts of sub-micron to under 5 micron sized material.

Collection of such solids has been a challenge for almost a century. A survey of the state of the art is described in Perry's Chemical Engineering Handbook, in DUST-COLLECTION EQUIPMENT, discussed in the parent application. FCC operators typically use cyclones to separate solids from gas.

Refiners typically use 2 to 8 primary and 2 to 8 secondary cyclones in their FCC regenerators, because of mechanical constraints and pressure drop concerns. These cyclones have a fairly large diameter, which restricts the amount of centrifugal acceleration which can be achieved.

Thus FCC regenerators inherently let a large amount of fines and dust, in the below 15 micron range, pass out with the flue gas. This material must be removed from the flue gas prior to discharge to the atmosphere, or passage through a power recovery turbine.

Generally a third stage separator is installed upstream of the turbine to reduce the catalyst loading and protect the turbine blades, or permit discharge of flue gas to the air. These can be 20, 50, 100 or even more small diameter cyclones. The third stage separator can use large numbers of small cyclones because it is not in or a part of the FCC regenerator. Small diameter cyclones are used because these give better fines collection than larger cyclones, for the same gas velocity and pressure drop. Perry's Chemical Engineer's Handbook, Sixth Edition, in Table 20-33 reports that for a 5–20 micron dust mixture, dust collection improves significantly as cyclone diameter decreased, with efficiencies for 6, 9 and 24 inch cyclones being 90%, 83% and 70% respectively.

Several vendors (Polutrol and Emtrol) supply systems with many small diameter, horizontally mounted, closely connected and radially distributed cyclones about a central gas outlet. The use of multiple, small, horizontally mounted cyclones is also known for general dust removal, see e.g., the Dustex miniature collector assemble shown in FIG. 20-108 of Perry's Chemical Engineering Handbook, Sixth Edition. Gas is tangentially added to a great number of generally horizontally mounted cyclones. Purified gas is withdrawn via a central gas outlet near the tangential inlet, while dust is removed from the opposite end of the cyclone, which may be of reduced diameter but is unsealed.

Our parent application was on improving the operation of horizontal cyclones. The problem was dust from an upper horizontal cyclone falling past a lower horizontal cyclone, with some dust reentrained in the vortex associated with a lower cyclone. Adding a "scroll" or "half-pipe" addition to the cyclone barrel improved solids recovery. The vortex associated with the cyclone was either enclosed (scroll) or protected somewhat (half-pipe extension).

While the improvements achieved in our parent case were significant, they did not address the different problems associated with third stage separators using large numbers of vertical cyclones. Recovery efficiency in these units was also not as high as desired.

We studied vertical third stage separators and believed that the problem was that the cyclone vortex extended out the bottom of the cyclones. This vortex extended into the collection chamber and was able to capture particles from the collection chamber and "emit" such particles.

We discovered that adding a device to shield the collected particles from the vortex improved collection efficiency.

BRIEF SUMMARY OF THE INVENTION

The present invention provides a vertical cyclone separator comprising: a primary cylindrical cyclone body having a diameter and a longitudinal axis disposed vertically or within 30° of vertical, said primary cyclone body having: an open end portion having a vapor inlet for a vapor stream and entrained solids; a cylindrical vapor outlet tube in said open end portion having an inlet extending into said primary cylindrical cyclone body and a vapor outlet tube longitudinal axis aligned with said longitudinal axis of said primary cylindrical cyclone body; a vortex outlet at an opposite end of said primary cylindrical cyclone body for vapor and entrained solids, said vortex outlet comprising a circular opening having a center in axial alignment with said vapor outlet tube, and wherein said vortex outlet has a diameter no greater than the diameter of said primary cylindrical cyclone body; a vortex-containment cylindrical body having cylindrical sidewalls, a length and having a diameter no greater than the diameter of said primary cyclone body at the inlet, said vortex-containment cylindrical body having a longitudinal axis axially aligned with said primary cyclone body longitudinal axis and comprising: an open end connective with said vortex outlet of said primary cyclone body for admission of a vortex of gas and entrained solids; a sealed end portion located at an opposing end of said cylindrical body from said open end; and a solids and gas outlet slot in a lower portion of a sidewall of said vortex cylinder parallel to the axis of said vortex-containment cylindrical body.

In another embodiment, the present invention provides a fluidized catalytic cracking process wherein a heavy feed is catalytically cracked with a regenerated cracking catalyst in a cracking reactor to produce lighter products and spent catalyst, spent catalyst is regenerated in a catalyst regenerator containing separation means for recovery of catalyst and fines from flue gas to produce a flue gas stream containing entrained catalyst fines which is charged to a third stage separator which removes at least a portion of the catalyst fines from the flue gas, said third stage separator comprising at least 10 vertical cyclones, each comprising: a primary cylindrical cyclone body having a diameter and a longitudinal axis disposed vertically or within 30° of vertical, said primary cyclone body having: an open end portion having a vapor inlet for a vapor stream and entrained solids; a cylindrical vapor outlet tube in said open end portion having an inlet extending into said primary cylindrical cyclone body and a vapor outlet tube longitudinal axis aligned with said longitudinal axis of said primary cylindrical cyclone body; a vortex outlet at an opposite end of said primary cylindrical cyclone body for vapor and entrained solids, said vortex outlet comprising a circular opening having a center in axial alignment with said vapor outlet tube, and wherein said vortex outlet has a diameter no greater than the diameter of said primary cylindrical cyclone body; and a vortex-containment cylindrical body having cylindrical sidewalls, a length and having a diameter no greater than the diameter of said primary cyclone body at the inlet, said vortex-containment cylindrical body having a longitudinal axis axially aligned with said primary cyclone body longitudinal axis and comprising: an open end connective with said vortex outlet of said primary cyclone body for admission of a vortex of gas and entrained solids; a sealed end portion located at an opposing end of said cylindrical body from said open end; and a solids and gas outlet slot in a lower portion of a sidewall of said vortex cylinder parallel to the axis of said vortex-containment cylindrical body.

DETAILED DESCRIPTION

Figure 1:
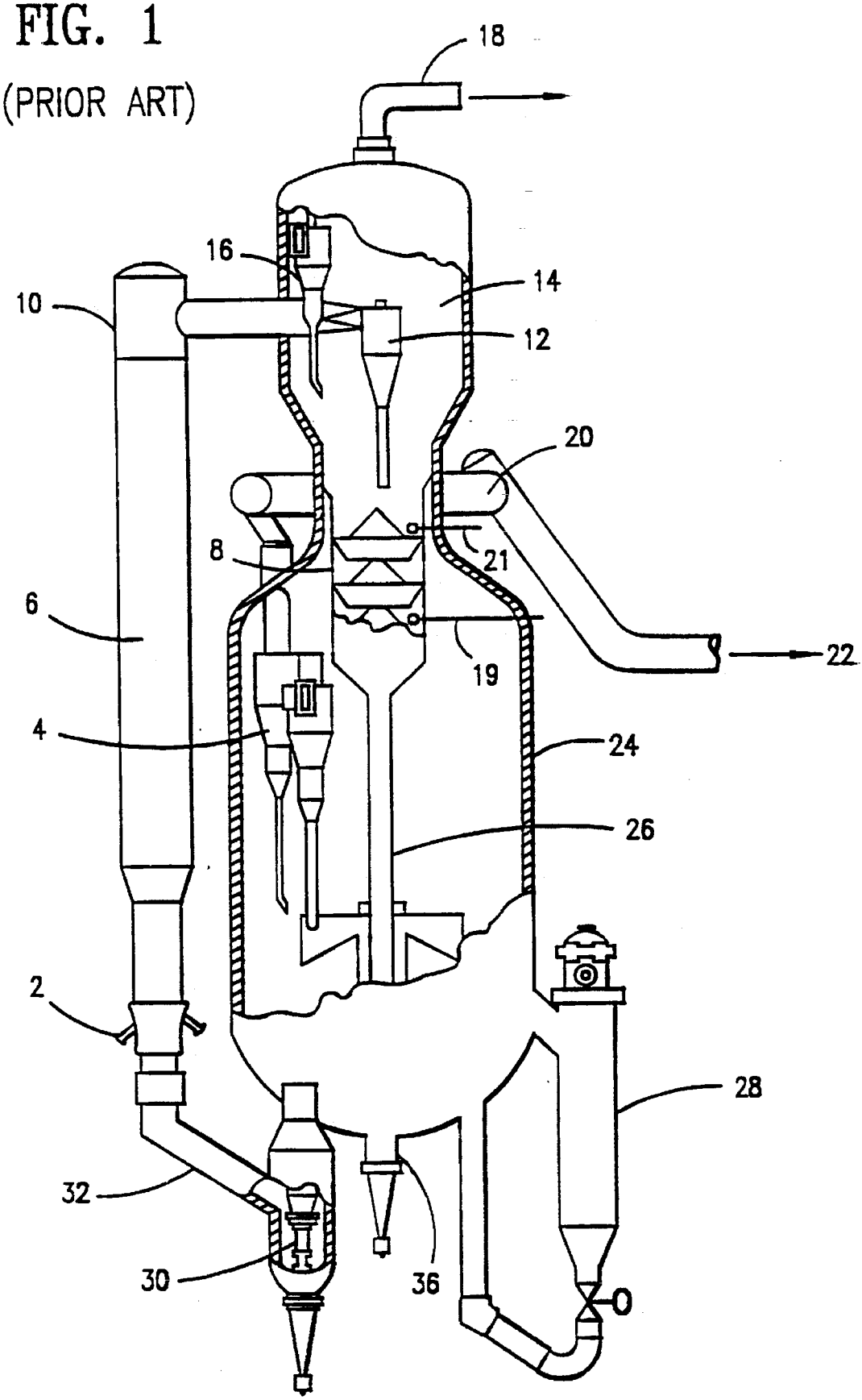
FIG. 1 (prior art) is a simplified schematic view of an FCC unit of the prior art.

The present invention can be better understood by reviewing it in conjunction with a conventional riser cracking FCC unit. FIG. 1 shows an FCC system of the prior art, and is similar to the Kellogg Ultra Orthoflow converter Model F shown as FIG. 17 of Fluid Catalytic Cracking Report, in the Jan. 8, 1990 edition of Oil & Gas Journal. There are myriad other FCC units which can benefit from the process of the present invention, but the process of the present invention works very well with this type of FCC unit.

Heavy feed such as gas oil and/or resid is added to riser reactor 6 via feed injection nozzles 2. Cracking is almost completed in the riser reactor, which takes a 90° turn at the top of the reactor at elbow 10. Spent catalyst and cracked products discharged from the riser reactor pass through riser cyclones 12 which separate most spent catalyst from cracked product. Cracked product is discharged into disengager 14 and eventually is removed via upper cyclones 16 and conduit 18 to the fractionator.

Spent catalyst is discharged via a dipleg of riser cyclones 12 into catalyst stripper 8 where one, or preferably 2 or more, stages of steam stripping occur, with stripping steam admitted by means 19 and 21. The stripped hydrocarbons, and stripping steam, pass into disengager 14 and are removed with cracked products after passage through upper cyclones 16.

Stripped catalyst is discharged down via spent catalyst standpipe 26 into catalyst regenerator 24. The flow of catalyst is controlled with spent catalyst plug valve 36.

Catalyst is regenerated in regenerator 24 by contact with air, added via air lines and an air grid distributor not shown. A catalyst cooler 28 is provided so heat may be removed from the regenerator if desired. Regenerated catalyst is withdrawn from via regenerated catalyst plug valve 30 and discharged via lateral 32 into the base of the riser 6 to crack fresh feed as previously discussed. Flue gas, and some entrained catalyst, is discharged into a dilute phase region in the upper portion of regenerator 24. Entrained catalyst is separated from flue gas in cyclones 4 and discharged via outlets 38 into plenum 20 for discharge to the flue gas line via line 22.

This regenerator is ideal for the practice of the present invention. The bubbling dense bed in such a regenerator exhibits excellent horizontal mixing, and the heat exchanger 28 allows full CO burn operation even with heavy feeds.

FIG. 1 does not show a third stage separator. Line 22 in most refineries would go to some type of third stage separator (not shown), usually one involving 50 or 100 (or more) small diameter horizontal cyclones. Purified flue gas would then pass through an optional power recovery turbine (not shown) then go to a stack for discharge to the atmosphere, via some flue gas clean up devices, such as an SOx scrubber, or electrostatic precipitator.

Figure 2:
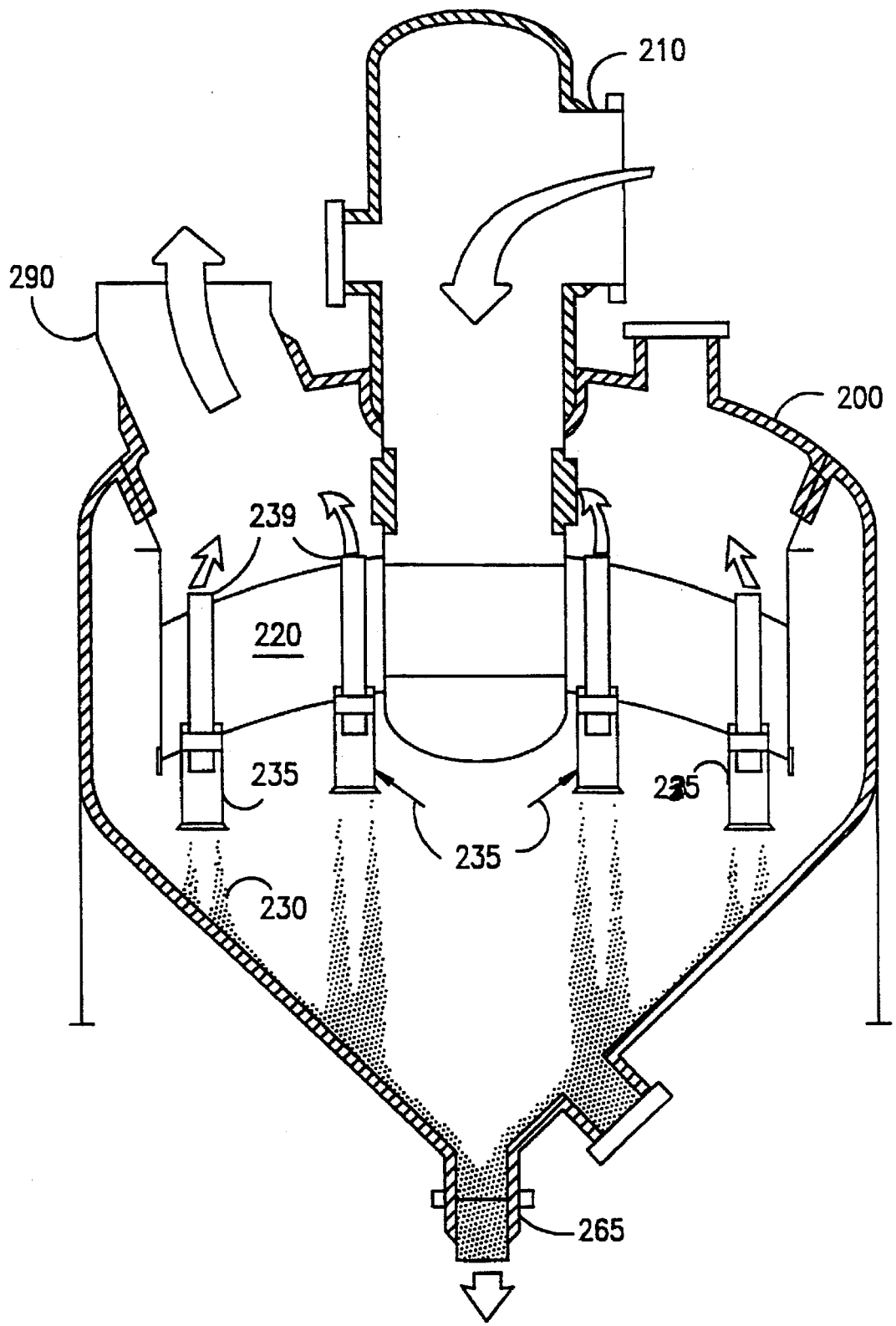
FIG. 2 (prior art) is a simplified schematic view of a third stage separator of the prior art with vertical cyclones.

FIG. 2 (Prior Art) is similar to FIG. 1 of Improved hot-gas expanders for cat cracker flue gas, Hydrocarbon Processing, Mar. 1976, p. 141. This article is incorporated by reference.

Third stage separator 200 receives a fines containing FCC flue gas via inlet 210. Gas is distributed via plenum 220 to the inlets of a plurality of small diameter ceramic tubes 235 containing swirl vanes not shown. Fines collect on the walls of tubes 235 and are discharged from the base of the tubes as an annular stream of solids 230. A clean gas stream is withdrawn via outlet tubes 239 to be removed from the vessel via outlet 290. Solids are removed via solids outlet 265.

Figure 3:
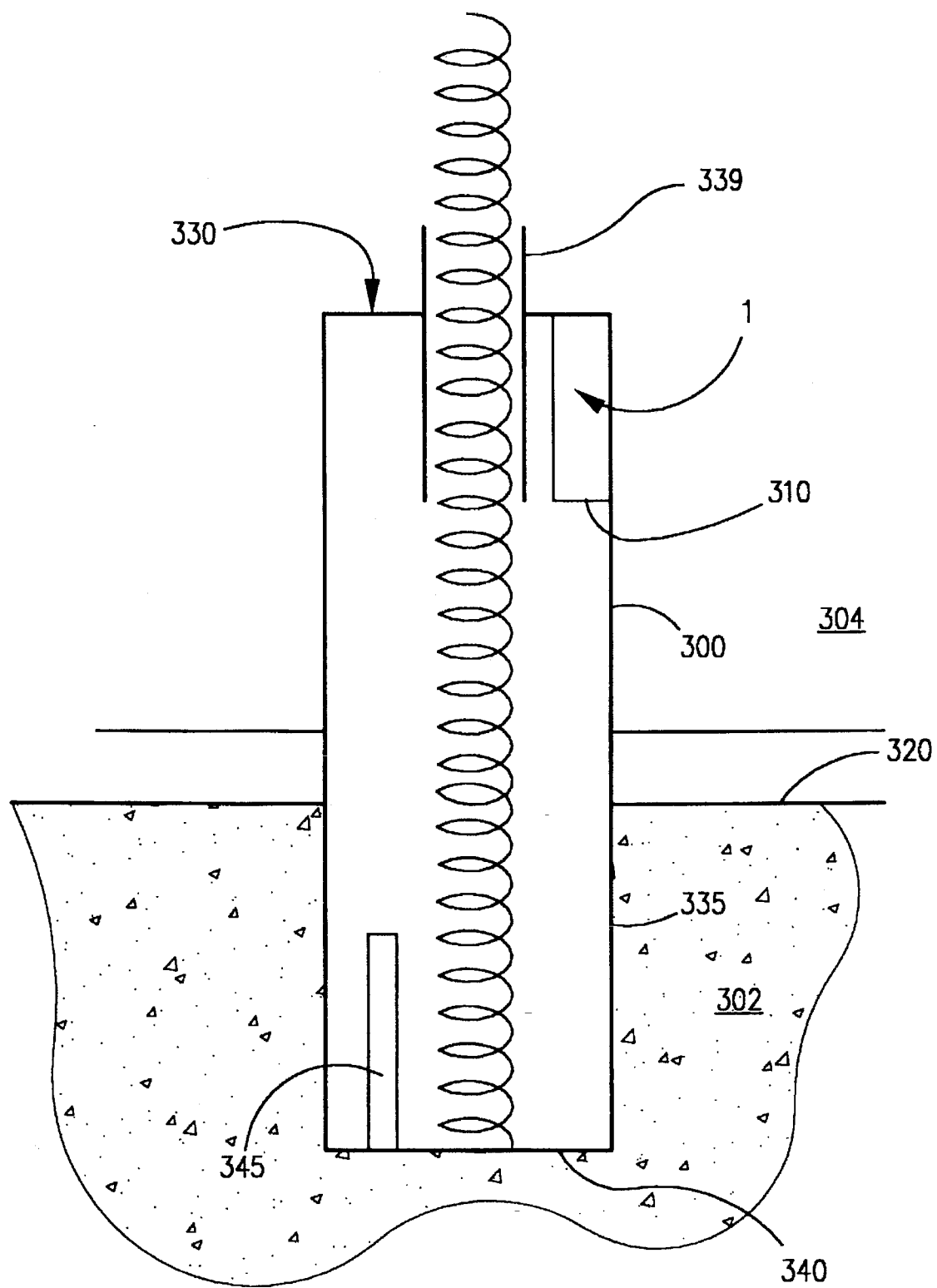
FIG. 3 (Invention) is a sectional view of a vertical cyclone for use in a third stage separator having the outlet modification of the invention.

FIG. 3 (invention) shows a detailed schematic view of one vertical cyclone in a third stage separator. The dust laden gas enters cyclone 300 via either conventional tangential inlet or via a conventional axial inlet 330. Clean gas is removed via outlet tube 339. The cyclone 300 is supported by plate member 320 which separates the catch chamber 302 from the gas distributing chamber 302.

The unstable vortex formed within the cyclone is contained, and effectively isolated from the dust catch chamber by tubular barrel 335. Dust is discharged from the interior of the cyclone body via a vertically oriented, rectangular shaped slot 345. The catch chamber 302 is full of dust particles, discharged either from cyclone 300 or other similar cyclones not shown. The collected particles in the catch chamber fall down for eventual removal.

Having provided an overview of the FCC process and the new cyclone design, a more detailed review of the FCC process and of preferred cyclone separators follows. Much of the following discussion is brief, either because the items discussed are conventional or because they were discussed at greater length in our parent case, which was incorporated by reference.

FCC FEED Any conventional FCC feed can be used.

FCC CATALYST Any commercially available FCC catalyst may be used. The catalyst inventory may contain additives as separate particles, or mixed in with each particle of the cracking catalyst. Additives can enhance octane (shape selective zeolites, typified by ZSM-5, and other materials having a similar crystal structure), absorb SOX (alumina), or remove Ni and V (Mg and Ca oxides).

FCC REACTOR CONDITIONS Conventional cracking conditions may be used. Typical riser cracking reaction conditions include catalyst/oil ratios of 0.5:1 to 15:1 and preferably 3:1 to 8:1, and a catalyst contact time of 0.1–50 seconds, and preferably 0.5 to 5 seconds, and most preferably about 0.75 to 4 seconds, and riser top temperatures of 900° to about 1050° F. Other preferred techniques and equipment are discussed in our parent patent.

CATALYST REGENERATION The process and apparatus of the present invention can use conventional FCC regenerators. Most regenerators are bubbling dense bed or high efficiency. The regenerator, per se, forms no part of the present invention.

THIRD STAGE SEPARATOR

The cyclones of the invention are preferably used as a third stage separator removing catalyst and fines from regenerator flue gas. The conventional parts of the device are available commercially. Shell makes TSS units with vertical cyclones. The process and apparatus of the present invention is primarily directed at the small diameter vertical cyclones used in such TSS units.

In prior art TSS units using vertical cyclones the unstable vortex, and/or gas currents associated with it, would collect or interact with some of the falling dust and cause it to be discharged with the clean gas in the form of increased emissions. In our process we put a shield around the vortex to shield particles in the catch chamber from vortex.

The primary modification to the small cyclones is closing that portion of the barrel which extends into the catch chamber. There must still be a way provided for particles to exit the cyclone, and this is achieved by use of one or more openings in the sidewall of the cyclone barrel.

A good particulates exit is a simple rectangular slot cut in the sidewall of the device, although openings may also be punched or drilled. The slot (345 in FIG. 3) should be sized large enough to handle anticipated solids flow, and will typically be from 10 to 200% or more of the cross sectional area of the outlet tube 414. The slot is preferably beveled so that fluid flow from the interior of the device through the slot is tangential.

The slot may also be simply punched or drilled, or have a slightly raised lip to divert circulating solids from the interior of the solids outlet through the slot.

While the slot outlet is preferably the sole solids outlet the device will work with two or more outlets, such as holes or openings in the normally closed end 340 of the device.

CYCLONE DIMENSIONS

Much of the cyclone design is conventional, such as sizing of the inlet, setting ratios of ID of the outlet tube to other dimensions, etc. Further details, and naming conventions, may be found in Perry's Chemical Engineers' Handbook, 6th Edition, Robert H. Perry and Don Green, incorporated by reference. The nomenclature discussion in Gas-Solids Separations, from 20-75 to 20-77, FIG. 20-106, 20-107 and 20-108 is referred to and incorporated by reference.

The design approach used for the claimed vertical cyclones can be essentially the same as that used to size the horizontal cyclones disclosed in our prior, copending application, which has been incorporated by reference.

EXPERIMENTS

Several tests were conducted with small diameter horizontal cyclones of various sizes, using both 90 and 65 mm outlet tube diameters, with 2% underflow. While horizontal cyclones are not covered by the claims of the present invention, based on other experiments not reported here, we believe that the improvements seen in horizontal cyclones will also be seen in vertical cyclones.

Three types of horizontal cyclones were tested:
1. Prior art cyclones (no extension on the solids outlet).
2. Scroll solids outlet—FIG. 6 of Parent Patent.
3. Halfpipe solids outlet—FIG. 9 of Parent Patent.

The cyclones were tested at various inlet velocities, generally ranging from 80 to 140 feet per second, fps, using used FCC catalyst. Cyclone efficiencies were determined at multiple inlet velocities to generate the data shown in FIG. 10 of our parent patent, which shows cyclone efficiency as a function of inlet velocity for different types of cyclones.

Both 65 and 90 mm outlet tube diameters were tested. The outlet extensions were 500 mm in length and were fabricated from 8" schedule 40 pipe for both the scroll and the halfpipe extensions.

For the scroll extension the slot width was 20 mm, and the slots were oriented with induced rotation. The width of the tangential inlet 685 was 85 mm, while the length of the tangential inlet was 130 mm, or just slightly less than the length of the outlet tube within the cyclone body.

Experimental results are presented in the parent patent.

DISCUSSION

The new cyclone design is easy to fabricate using conventional techniques. The device significantly improves removal of fine dust, that is, 0–5 micron particles. The design reduces erosion of power recovery turbine blades, and also reduces particulates emissions. Our device may be easily retrofit to commercial installations of small diameter, vertically mounted multi-cyclone units to significantly enhance efficiency.

The capital expense involved is minimal, and there are almost no operating expenses associated with such a retrofit. There will be little increase in pressure drop getting through the cyclones, most of the energy consumed in such cyclones is used in accelerating the gas to form a high energy vortex.

The scroll solids outlet of the invention may even permit a significant reduction in pressure drop, because the improved efficiency of cyclone separation should permit use of less vigorous vortex formation and consequently, require less pressure drop to get through the cyclones.

We claim:

1. A vertical cyclone separator comprising:

a primary cylindrical cyclone body having a diameter and a longitudinal axis disposed vertically or within 30° of vertical, said primary cyclone body having:

an open end portion having a vapor inlet for a vapor stream and entrained solids;

a cylindrical vapor outlet tube in said open end portion having an inlet extending into said primary cylindrical cyclone body and a vapor outlet tube longitudinal axis aligned with said longitudinal axis of said primary cylindrical cyclone body;

a vortex outlet at an opposite end of said primary cylindrical cyclone body for vapor and entrained solids, said vortex outlet comprising a circular opening having a center in axial alignment with said vapor outlet tube, and wherein said vortex outlet has a diameter no greater than the diameter of said primary cylindrical cyclone body;

a vortex-containment cylindrical body having cylindrical sidewalls, a length and having a diameter no greater than the diameter of said primary cyclone body at the inlet, said vortex-containment cylindrical body having a longitudinal axis axially aligned with said primary cyclone body longitudinal axis and comprising:

an open end connective with said vortex outlet of said primary cyclone body for admission of a vortex of gas and entrained solids;

a sealed end portion located at an opposing end of said cylindrical body from said open end; and a solids and gas outlet slot in a lower portion of a sidewall of said vortex cylinder parallel to the axis of said vortex-containment cylindrical body.

2. The cyclone of claim 1 said slot has a length at least 50% of the length of said vortex-containment cylindrical body.

3. The cyclone of claim 1 said slot has a length equal to the length of said vortex-containment cylindrical body.

4. The cyclone of claim 1 wherein said slot has beveled edges for tangential removal of solids and gas from said vortex-containment cylindrical body.

5. The cyclone of claim 1 wherein said primary cylindrical body and said vortex containment body are mounted vertically.

6. The cyclone of claim 1 wherein said open end portion comprises a tangential vapor inlet for a vapor stream and entrained solids.

7. The cyclone of claim 1 wherein said open end portion comprises an axial vapor inlet for a vapor stream and entrained solids.

8. The cyclone of claim 6 wherein the diameter of said vortex containment body is 100 to 150% of the diameter of said primary cyclone body at the tangential inlet.

9. The cyclone of claim 1 wherein a truncated conical section connects said primary cyclone body to said vortex containment body.

10. The cyclone of claim 1 wherein the vortex containment body has a length at least equal to the length of the vapor outlet within the primary cyclone body.

* * * * *